United States Patent
Lee et al.

(10) Patent No.: US 12,368,154 B2
(45) Date of Patent: Jul. 22, 2025

(54) CATHODE ACTIVE MATERIAL FOR LITHIUM SECONDARY BATTERY, MANUFACTURING METHOD THEREOF, AND LITHIUM SECONDARY BATTERY COMPRISING SAME

(71) Applicant: LG CHEM, LTD., Seoul (KR)

(72) Inventors: Dongwook Lee, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 655 days.

(21) Appl. No.: 16/980,151

(22) PCT Filed: Aug. 2, 2019

(86) PCT No.: PCT/KR2019/009648
§ 371 (c)(1),
(2) Date: Sep. 11, 2020

(87) PCT Pub. No.: WO2020/040446
PCT Pub. Date: Feb. 27, 2020

(65) Prior Publication Data
US 2021/0050587 A1    Feb. 18, 2021

(30) Foreign Application Priority Data
Aug. 24, 2018    (KR) .................. 10-2018-0099265

(51) Int. Cl.
*H01M 4/133*    (2010.01)
*H01M 4/131*    (2010.01)
(Continued)

(52) U.S. Cl.
CPC ........... *H01M 4/133* (2013.01); *H01M 4/131* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS

2011/0104571 A1    5/2011    Zhamu et al.
2014/0255786 A1    9/2014    Oh et al.
(Continued)

FOREIGN PATENT DOCUMENTS

| CN | 106374087 A | 2/2017 |
|---|---|---|
| CN | 107431199 A | 12/2017 |

(Continued)

OTHER PUBLICATIONS

English translation of KR 2015/0061874 (Year: 2015).*
(Continued)

*Primary Examiner* — Yoshitoshi Takeuchi
(74) *Attorney, Agent, or Firm* — Birch, Stewart, Kolasch & Birch, LLP

(57) ABSTRACT

A positive electrode active material for a lithium secondary battery including a carbon material impregnated with catalyst particles, and a sulfur-carbon composite, a preparation method thereof, and a positive electrode for a lithium secondary battery, and the lithium secondary battery including the same.

13 Claims, 8 Drawing Sheets

(51) Int. Cl.
| | |
|---|---|
| *H01M 4/134* | (2010.01) |
| *H01M 4/136* | (2010.01) |
| *H01M 4/1391* | (2010.01) |
| *H01M 4/1393* | (2010.01) |
| *H01M 4/1395* | (2010.01) |
| *H01M 4/1397* | (2010.01) |
| *H01M 4/36* | (2006.01) |
| *H01M 4/58* | (2010.01) |
| *H01M 10/052* | (2010.01) |
| *H01M 4/02* | (2006.01) |

(52) U.S. Cl.
CPC ....... *H01M 4/1391* (2013.01); *H01M 4/1393* (2013.01); *H01M 4/1395* (2013.01); *H01M 4/1397* (2013.01); *H01M 4/364* (2013.01); *H01M 4/58* (2013.01); *H01M 10/052* (2013.01); *H01M 2004/028* (2013.01)

(56) References Cited

U.S. PATENT DOCUMENTS

| | | | | |
|---|---|---|---|---|
| 2015/0228972 A1* | 8/2015 | Cho | ...................... | H01M 4/625 |
| | | | | 429/223 |
| 2015/0238937 A1* | 8/2015 | Kang | ................... | B01J 37/0213 |
| | | | | 427/249.1 |
| 2017/0352909 A1 | 12/2017 | Ainsworth et al. | | |
| 2018/0019465 A1* | 1/2018 | Kim | ..................... | H01M 4/623 |
| 2019/0267625 A1 | 8/2019 | Lee et al. | | |

FOREIGN PATENT DOCUMENTS

| | | | | | |
|---|---|---|---|---|---|
| CN | 107819117 | A | 3/2018 | | |
| CN | 108232164 | A | 6/2018 | | |
| JP | 5623303 | B2 | 11/2014 | | |
| JP | 2018-500741 | | 1/2018 | | |
| JP | 2015-207469 | A | 6/2025 | | |
| KR | 10-2014-0111516 | A | 9/2014 | | |
| KR | 2015/0061874 | | * 6/2015 | ............ | H01M 10/05 |
| KR | 10-2017-0029703 | A | 3/2017 | | |
| KR | 10-2017-0035817 | A | 3/2017 | | |
| KR | 20170035817 | | * 3/2017 | .............. | H01M 4/36 |
| KR | 10-1737217 | B1 | 5/2017 | | |
| KR | 10-2018-0061034 | A | 6/2018 | | |

OTHER PUBLICATIONS

Phokha et al, Effects of CeO2 nanoparticles on electrochemical properties of carbon/CeO2 composites, vol. 446 Applied Surface Science pp. 36-46 (Year: 2018).*

International Search Report issued in PCT/KR2019/009648 (PCTISA210), dated Nov. 6, 2019.

* cited by examiner

[Figure 1]
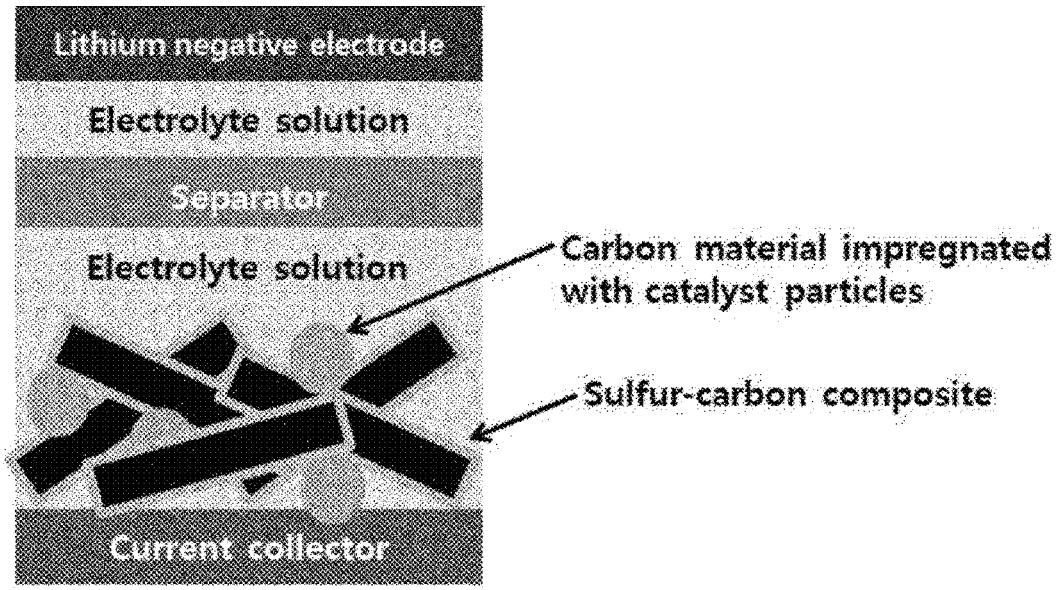
[Figure 2]
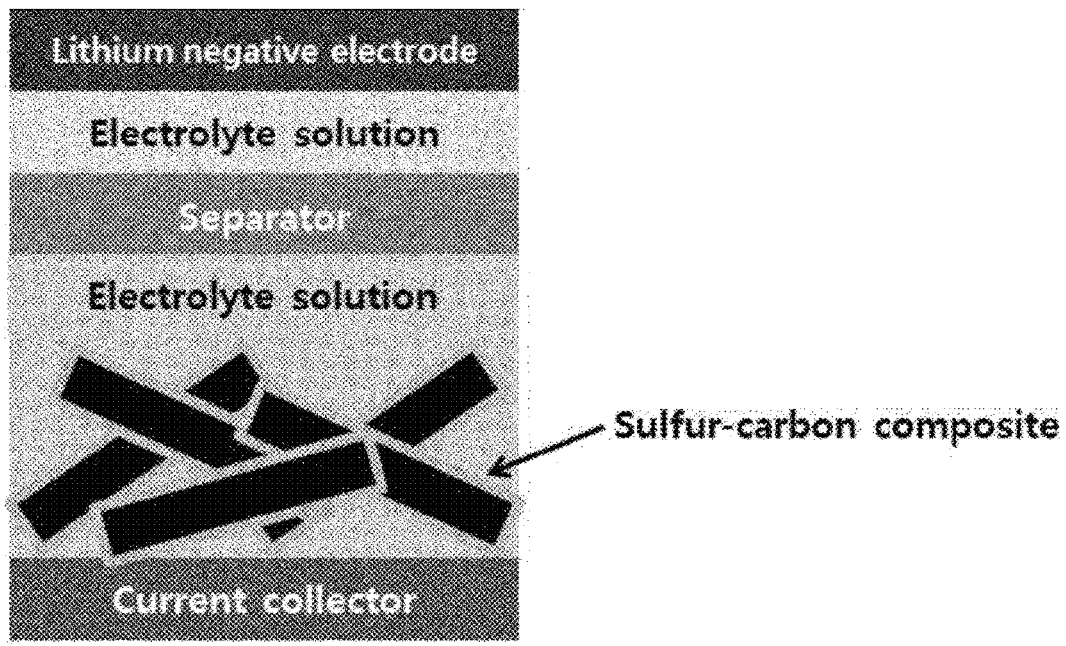

[Figure 3]
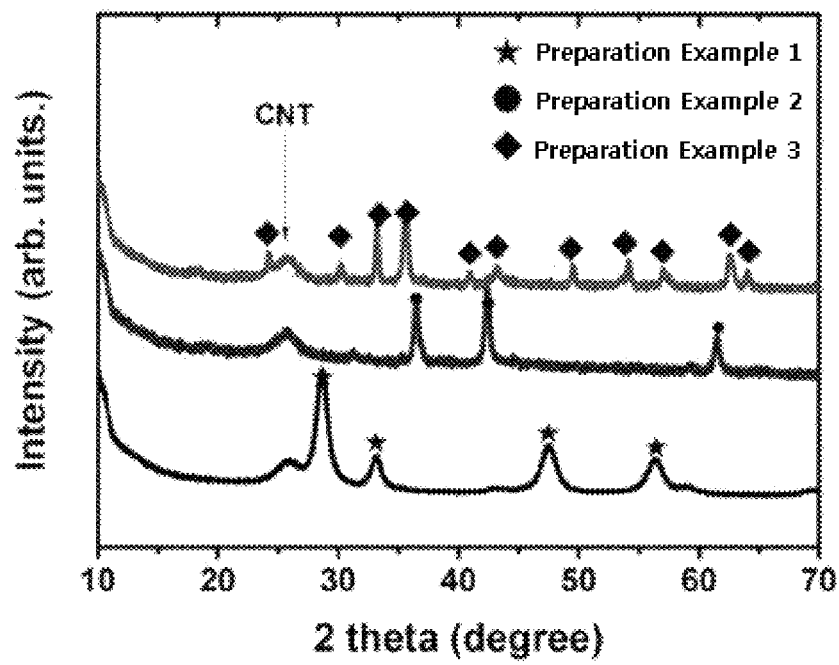
[Figure 4]
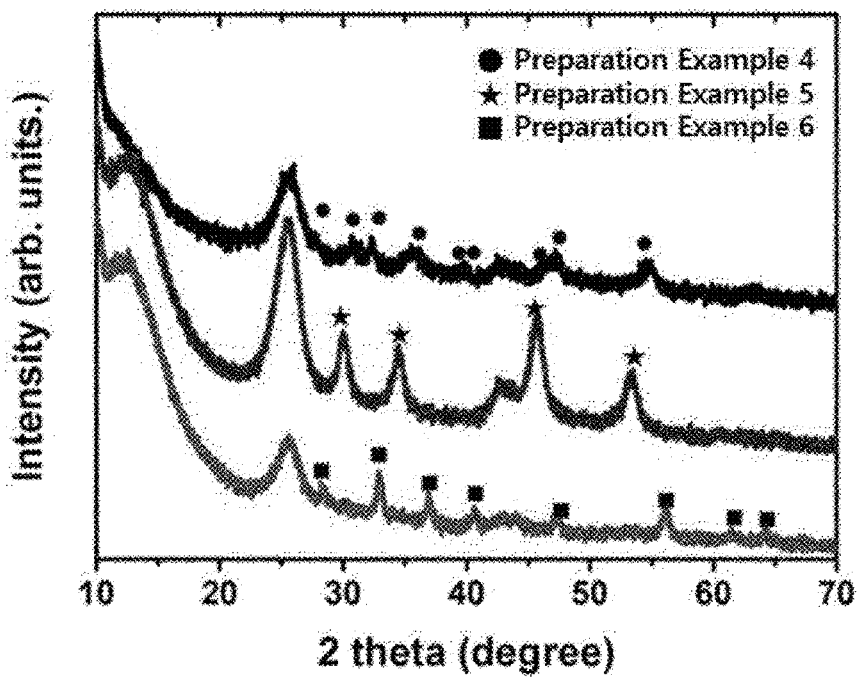

[Figure 5]
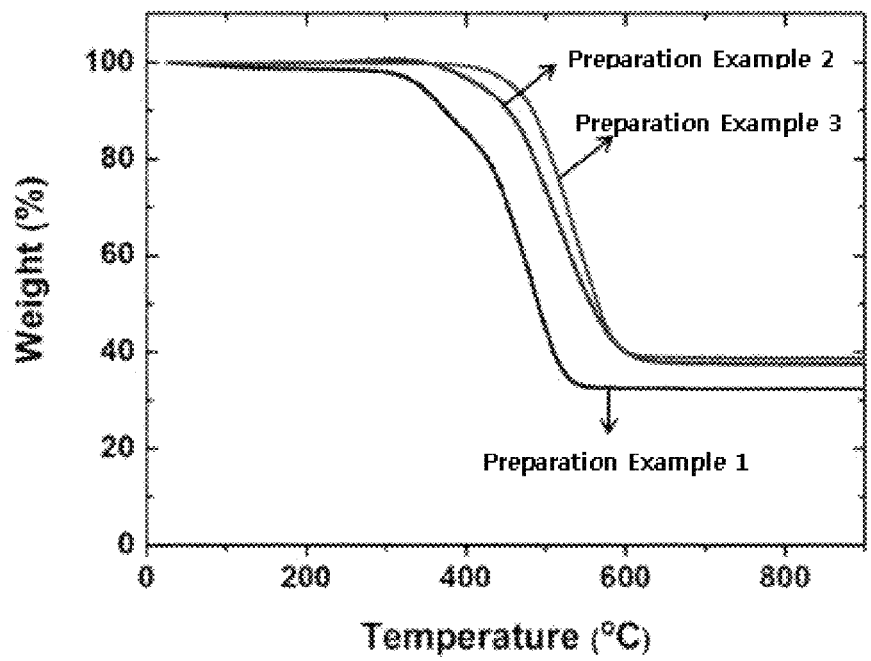

[Figure 6]
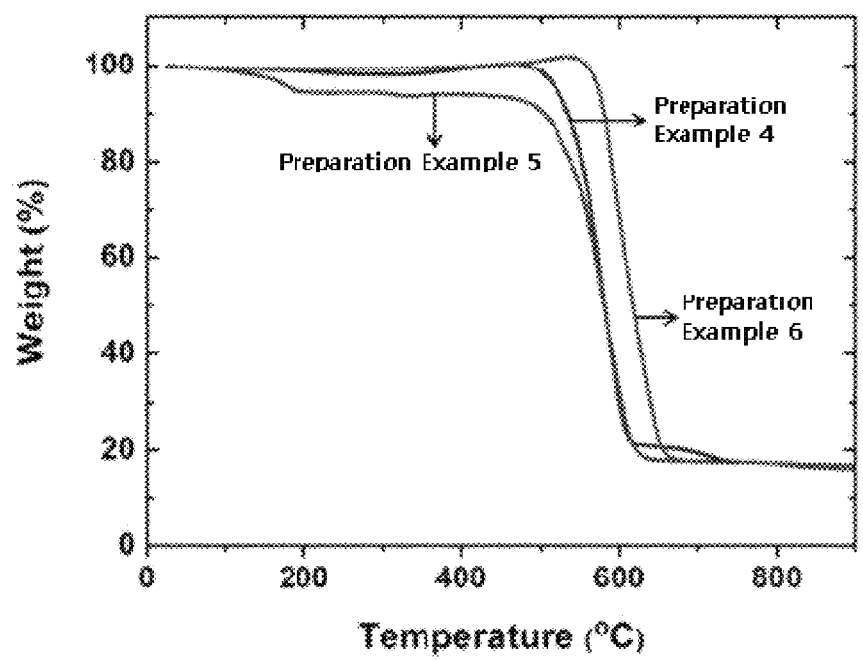
[Figure 7]
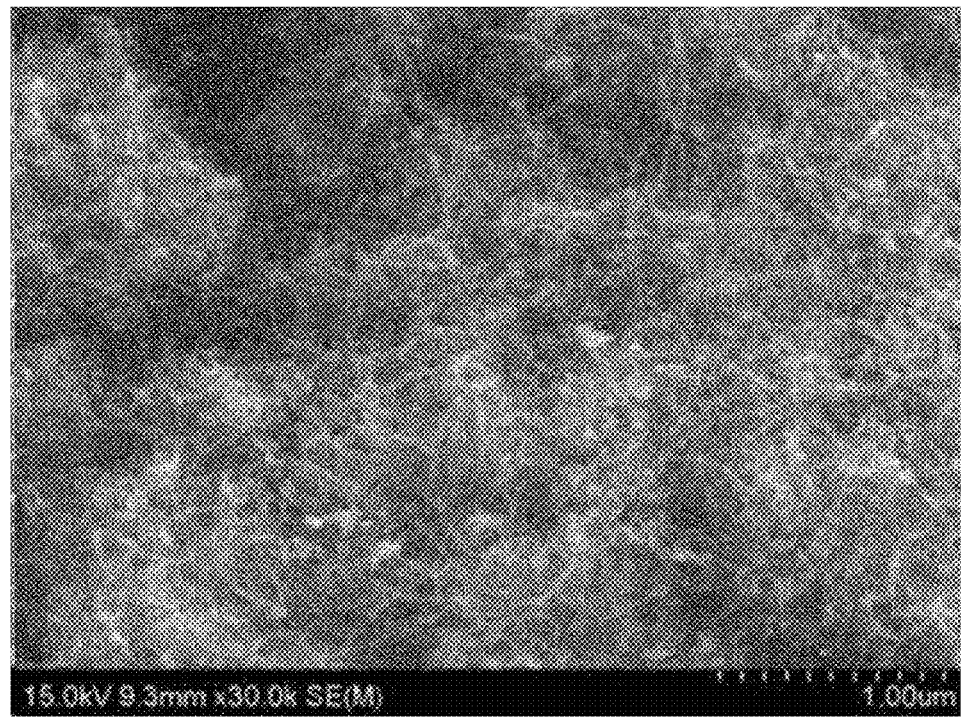

[Figure 8]
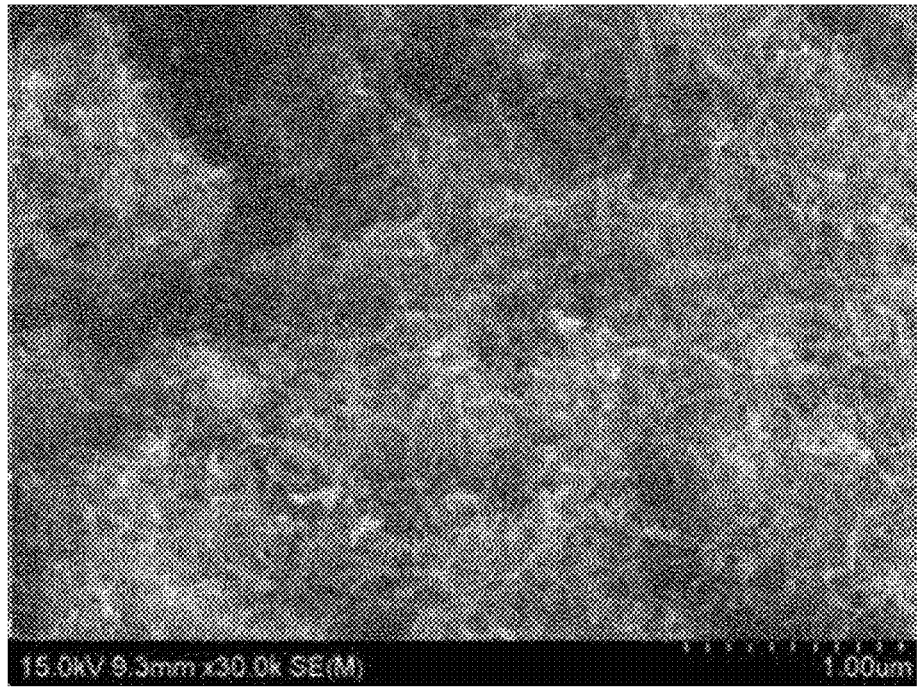
[Figure 9]
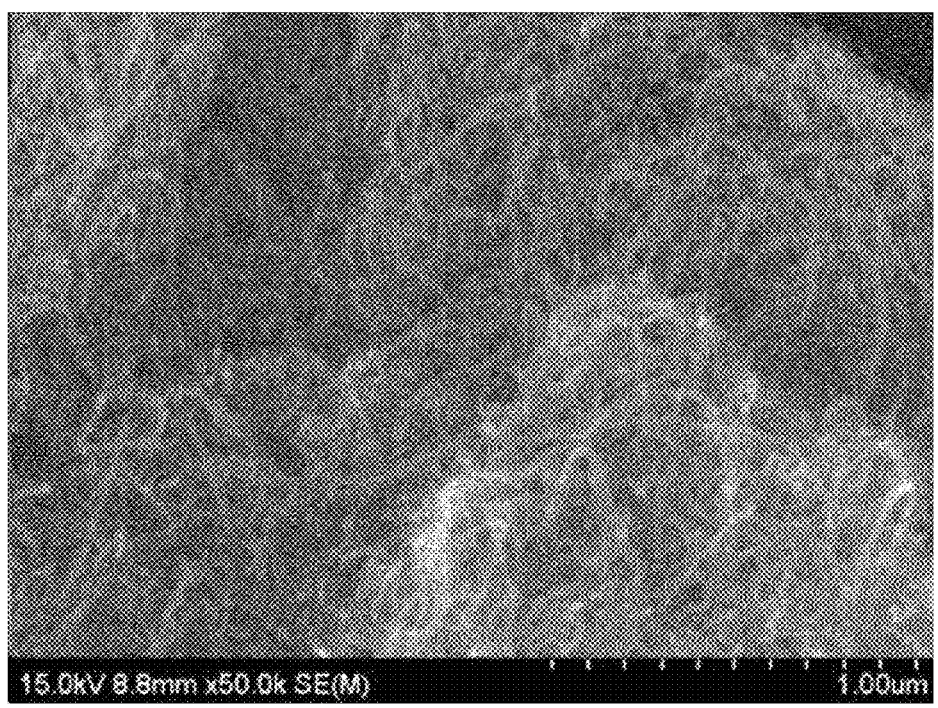

[Figure 10]
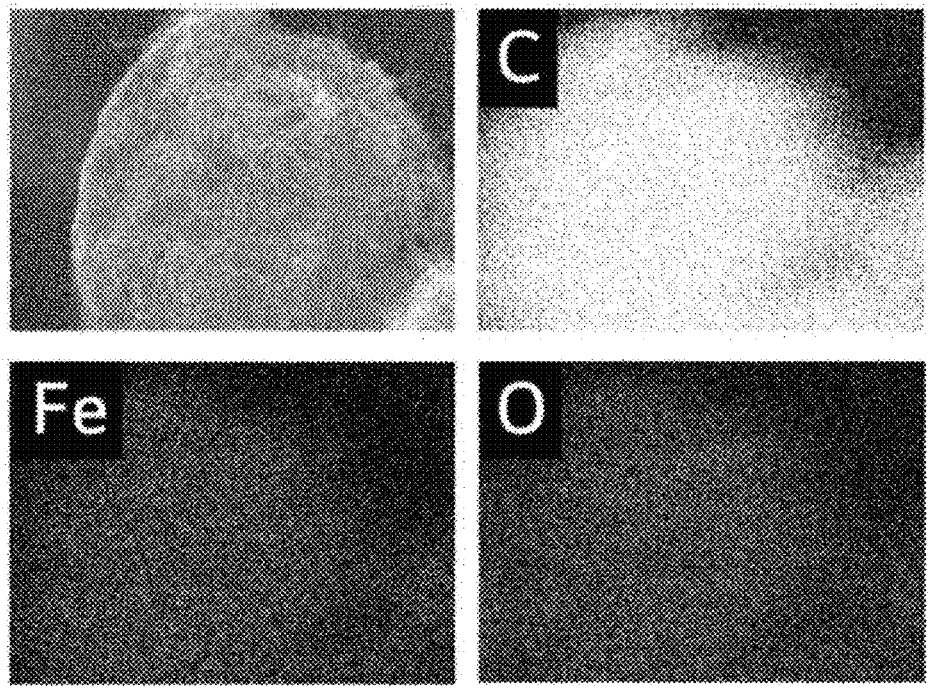
[Figure 11]
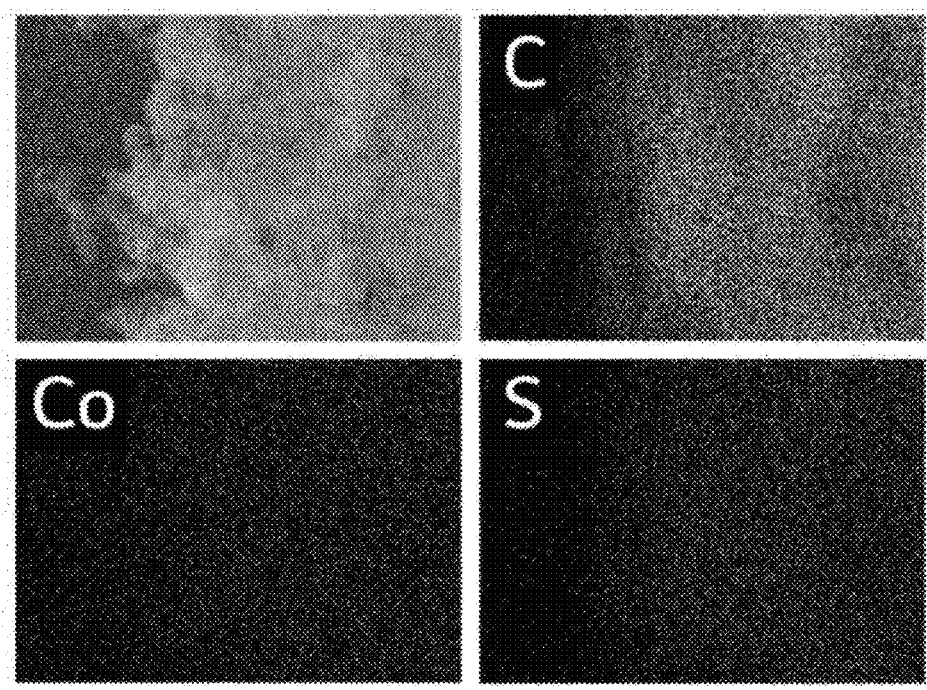

[Figure 12]
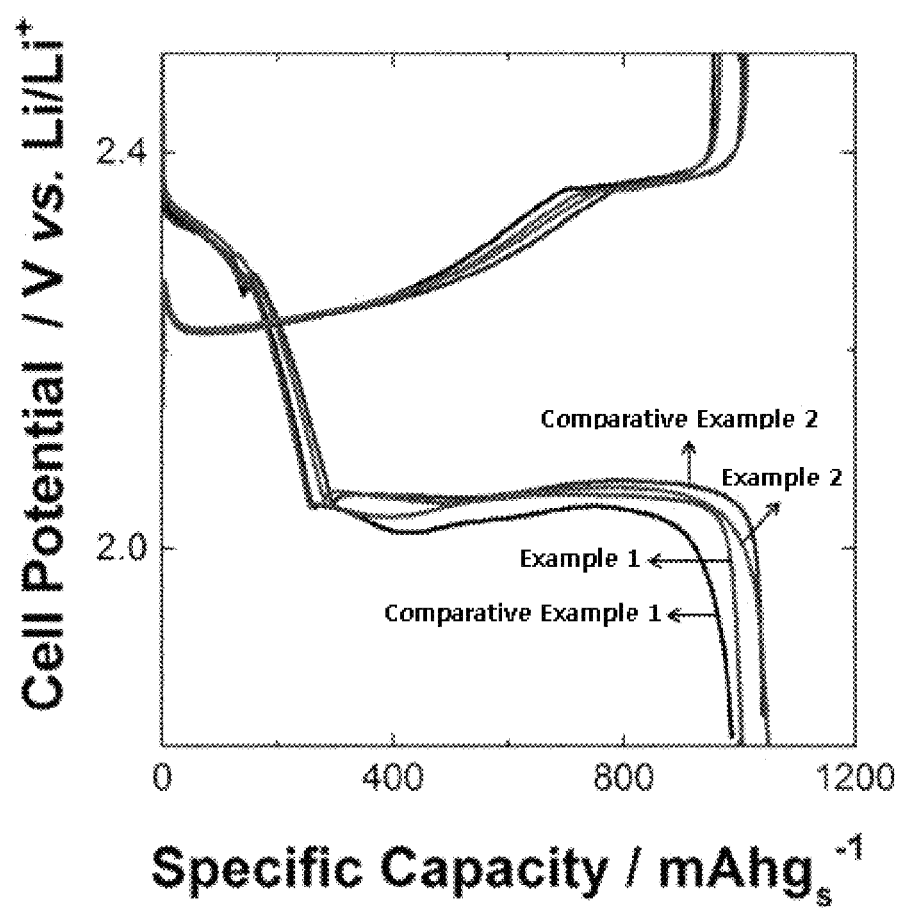

[Figure 13]
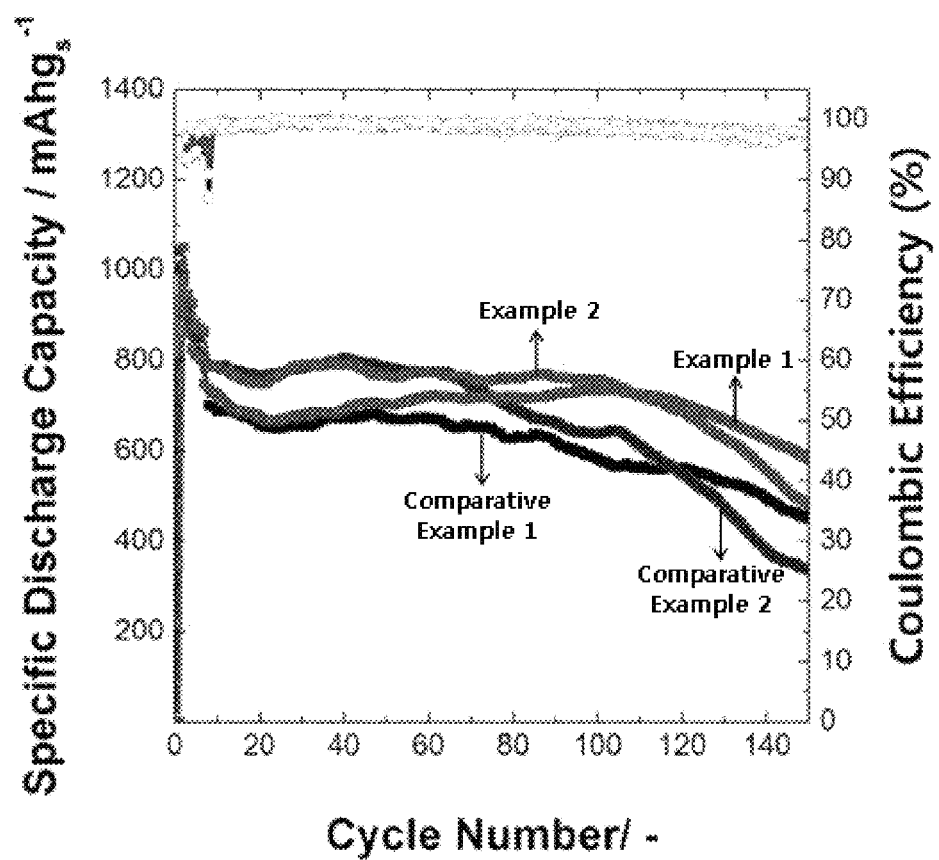

CATHODE ACTIVE MATERIAL FOR LITHIUM SECONDARY BATTERY, MANUFACTURING METHOD THEREOF, AND LITHIUM SECONDARY BATTERY COMPRISING SAME

TECHNICAL FIELD

The present application claims the benefit of priority based on Korean Patent Application No. 10-2018-0099265 filed on Aug. 24, 2018, the entire disclosure of which are incorporated herein by reference its entirety.

The present invention relates to a positive electrode active material for a lithium secondary battery comprising a carbon material impregnated with catalyst particles and a sulfur-carbon composite, a preparation method thereof, and a lithium secondary battery comprising the same.

BACKGROUND ART

Recently, as the miniaturization and weight reduction of electronic products, electronic devices, communication devices and the like are rapidly progressing and the need for electric vehicles has been greatly increased in relation to environmental problems, there is a growing demand for performance improvements in secondary batteries used as energy sources for these products. Among them, the lithium secondary battery has been attracting considerable attention as a high-performance battery because of its high energy density and high standard electrode potential.

In particular, the lithium-sulfur (Li—S) battery is a secondary battery using a sulfur-based material having a sulfur-sulfur bond (S—S bond) as a positive electrode active material and using lithium metal as a negative electrode active material. There is an advantage that sulfur, which is the main material of the positive electrode active material, is very rich in resources, is not toxic, and has a low atomic weight. In addition, theoretical discharging capacity of the lithium-sulfur battery is 1,675 mAh/g-sulfur, and its theoretical energy density is 2,600 Wh/kg. Since the theoretical energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode and a reduction reaction of sulfur occurs at the positive electrode. Sulfur before discharging has an annular $S_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reduction reaction in which the oxidation number of S increases. During this reaction, the sulfur is converted from the annular $S_8$ structure to the lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by a step-wise discharge voltage unlike lithium ion battery.

Among lithium polysulfides such as Li$_2$S$_8$, Li$_2$S$_6$, Li$_2$S$_4$, and Li$_2$S$_2$, particularly, lithium polysulfide (Li$_2$S$_x$, usually x>4), which has a high oxidation number of sulfur, is easily dissolved in an electrolyte solution. The polysulfide ($S_8^{2-}$, $S_6^{2-}$) dissolved in the electrolyte solution diffuses away from the positive electrode where the lithium polysulfide is generated by the concentration difference. Thus, the polysulfide leached from the positive electrode is lost to the outside of the positive electrode reaction zone, making it impossible to perform the stepwise reduction to lithium sulfide (Li$_2$S). That is, since the lithium polysulfide which is present in the dissolved state away from the positive electrode and the negative electrode cannot participate in the charging and discharging reactions of the battery, the amount of sulfur participated in the electrochemical reaction is reduced at the positive electrode and as a result, it is a major factor in reducing the charging capacity and energy of the lithium-sulfur battery.

Furthermore, except that the polysulfide diffused into the negative electrode is floated or deposited in the electrolyte solution, there is a problem that the polysulfide diffused into the negative electrode reacts directly with lithium and sticks to the surface of the negative electrode in the form of Li$_2$S, thus causing the corrosion of the lithium negative electrode.

In order to minimize the leaching and diffusion of the polysulfides, studies are underway to modify the morphology of a positive electrode composite which forms a composite by loading sulfur particles on various carbon structures or metal oxides.

PRIOR ART DOCUMENT

[Patent Document]
  Japanese Patent Publication No. 2018-500741

DISCLOSURE

Technical Problem

As described above, in the case of the lithium secondary battery, particularly, the lithium-sulfur battery, there is a problem that as the charging/discharging cycles are progressed, the capacity and life characteristics of the battery are deteriorated due to the polysulfides being leached and diffused from the positive electrode. Accordingly, the inventors of the present invention have attempted to develop a positive electrode active material for a lithium secondary battery, preferably a lithium-sulfur battery, which can improve the positive electrode reactivity by improving the reaction rate of oxidation and reduction reaction of sulfur in the charging/discharging cycle of the lithium-sulfur battery.

Therefore, it is an object of the present invention to provide a positive electrode active material for a lithium secondary battery that can improve the discharging capacity and lifetime characteristics of the lithium secondary battery.

In addition, it is another object of the present invention to provide a positive electrode for a lithium secondary battery comprising the positive electrode active material for the lithium secondary battery, and a lithium secondary battery comprising the same.

Technical Solution

In order to achieve the above objects, the present invention provides a positive electrode active material for a lithium secondary battery, which comprises a carbon material impregnated with catalyst particles; and a sulfur-carbon composite.

In addition, the present invention provides a method for preparing the positive electrode active material for the lithium secondary battery comprising the steps of:
(1) preparing a metal precursor solution;
(2) mixing the metal precursor solution with a carbon material to prepare a carbon material impregnated with catalyst particles;
(3) mixing a porous carbon material and sulfur to prepare a sulfur-carbon composite; and
(4) mixing the carbon material impregnated with catalyst particles and sulfur-carbon composite.

In addition, the present invention provides a positive electrode for a lithium secondary battery comprising the positive electrode active material of the present invention.

In addition, the present invention provides a lithium secondary battery comprising a positive electrode; a negative electrode; a separator interposed between the positive electrode and negative electrode; and an electrolyte solution, wherein the positive electrode is the positive electrode of the present invention.

Advantageous Effects

The positive electrode active material of the present invention can increase the activity of the catalyst by comprising catalyst particles having a large specific surface area, thereby improving the positive electrode reactivity of the lithium secondary battery, preferably the lithium-sulfur battery and thus improving the discharging capacity, average voltage, and lifetime characteristics of the lithium-sulfur battery.

DESCRIPTION OF DRAWINGS

FIG. 1 is a schematic cross-sectional view of the lithium-sulfur battery comprising the positive electrode active material of the present invention.

FIG. 2 is a schematic cross-sectional view of the lithium-sulfur battery comprising the positive electrode active material of Comparative Example 1.

FIG. 3 is a XRD graph of the carbon material impregnated with catalyst particles of Preparation Examples 1 to 3.

FIG. 4 is a XRD graph of the carbon material impregnated with catalyst particles of Preparation Examples 4 to 6.

FIG. 5 is a TGA graph of the carbon material impregnated with catalyst particles of Preparation Examples 1 to 3.

FIG. 6 is a TGA graph of the carbon material impregnated with catalyst particles of Preparation Examples 4 to 6.

FIG. 7 is a SEM image of the carbon material impregnated with catalyst particles of Preparation Example 3.

FIG. 8 is a SEM image of the carbon material impregnated with catalyst particles of Preparation Example 4.

FIG. 9 is a SEM photograph of a carbon nanotube.

FIG. 10 is an EDX analysis image of the carbon material impregnated with catalyst particles of Preparation Example 3.

FIG. 11 is an EDX analysis image of the carbon material impregnated with catalyst particles of Preparation Example 4.

FIG. 12 is a charging/discharging graph of Experimental Example 2.

FIG. 13 is a lifetime measurement graph of Experimental Example 3.

BEST MODE

Hereinafter, the present invention will be described in detail.

It has been pointed out that the leaching problem of the lithium polysulfides ($Li_2S_8$, $Li_2S_6$, $Li_2S_4$) and the slow reaction rate (kinetic) of electrochemical reactions due to the low electrical conductivity of sulfur and the lithium sulfides ($Li_2S_2$, $Li_2S$) which occur during charging/discharging process of the lithium-sulfur battery among the lithium secondary batteries are factors that reduce the lifetime characteristics and rate characteristics of the lithium-sulfur battery.

To this end, conventionally, platinum (Pt) which is an electrochemical catalyst was used as a positive electrode active material of lithium-sulfur battery to improve the reaction rate of oxidation and reduction of sulfur during charging/discharging of lithium-sulfur battery and thus realize high performance of lithium-sulfur battery.

However, noble metal catalysts such as platinum not only are very expensive and difficult to commercialize, but also may be poisoned by oxidation and reduction of sulfur during charging/discharging, thereby making it difficult to introduce them as a positive electrode active material of a lithium-sulfur battery.

Therefore, the present invention is to provide a positive electrode active material for a lithium secondary battery, preferably a lithium-sulfur battery that can solve the above problems.

In addition, the present invention is to provide a positive electrode active material for a lithium-sulfur battery that can improve the discharging capacity, average voltage, and lifetime characteristics by introducing a catalyst with a small particle size, and thus maximizing catalyst activity due to the increase of specific surface area, and improving the reaction rate of oxidation and reduction reaction of sulfur during charging/discharging process of the lithium-sulfur battery.

Positive Electrode Active Material

The present invention relates to a positive electrode active material for a lithium secondary battery comprising a carbon material impregnated with catalyst particles; and a sulfur-carbon composite.

The positive electrode active material for the lithium secondary battery of the present invention may be preferably a positive electrode active material for a lithium-sulfur battery.

The catalyst particles act as a redox mediator during charging/discharging of a lithium-sulfur battery, thereby not only inhibiting the formation itself of the polysulfide with leaching characteristics, but also even if the polysulfide is leached, adsorbing it to prevent diffusion into the electrolyte solution. In this case, the electron transfer is facilitated by catalysis, the reduction reaction to the un-leached $Li_2S_2$ or $Li_2S$ in a solid phase is promoted to reduce the shuttle reaction, and the discharge reaction (reduction reaction) and the reaction rate may be accelerated, thereby reducing the amount of the polysulfide being leached. Therefore, the capacity and lifetime characteristics of the lithium-sulfur battery can be improved.

In the present invention, the catalyst particle may be a metal oxide or a metal sulfide, and the metal may be at least one selected from the group consisting of cerium (Ce), iron (Fe), cobalt (Co), nickel (Ni), molybdenum (Mo), titanium (Ti), copper (Cu), cadmium (Cd), lead (Pb), manganese (Mn), antimony (Sb), zinc (Zn), vanadium (V), and arsenic (As).

The catalyst particles have a larger adsorption amount and adsorption energy of polysulfide ions per unit area than carbon materials used for the composite, and since the catalyst particles not only adsorb but also act as a catalyst, the reactivity of the electrode is also improved, so that the catalyst particles can be preferably used as a redox mediator.

The average particle diameter of the catalyst particles is 0.1 to 500 nm, preferably 0.1 to 100 nm, more preferably 0.1 to 50 nm.

The smaller the average particle diameter of the catalyst particles is, the more the specific surface area is increased, and thus the activity is improved, and there is an advantage in the transfer of charge from the carbon host. As a result, the redox reaction of the lithium-sulfur battery is accelerated, thereby reducing the amount of polysulfide leached, and improving the capacity and lifetime characteristics of the lithium-sulfur battery.

The catalyst particles are contained in an amount of 10 to 50% by weight, preferably 20 to 40% by weight, based on the total weight of a carbon material impregnated with catalyst particles. If the catalyst particles are contained in an amount of less than 10% by weight, the catalyst activity may be lowered. If the catalyst particles are contained in an amount of more than 50% by weight, the content of the carbon material may be relatively reduced, thereby lowering the electrical conductivity and specific surface area.

The carbon material impregnating with the catalyst particles is not limited as long as it is conductive carbon, and may be crystalline or amorphous carbon. Preferably, a porous carbon powder or carbon structure having a large specific surface area and high electrical conductivity, which is a particle or structure having a size of nano units, is used as the carbon material. For example, the carbon-based material may be at least one selected from the group consisting of graphite-based materials such as natural graphite, artificial graphite, expanded graphite, and graphene, activated carbon-based material, carbon black-based materials such as channel black, furnace black, thermal black, contact black, lamp black, and acetylene black; carbon fiber-based materials, carbon nanotubes (CNT), and carbon nanostructures such as fullerene.

The carbon material impregnating with the catalyst particles is contained in an amount of 2.2 to 18.5% by weight, preferably 3.3 to 10.2% by weight based on the total weight of the positive electrode active material.

If the carbon material impregnating with the catalyst particles is contained in an amount of less than 2.2% by weight, the catalyst activity may be lowered. If the carbon material impregnating with the catalyst particles is contained in an amount of more than 18.5% by weight, the content of the sulfur-carbon composite may be relatively decreased, thereby lowering the battery performance.

If the catalyst particles grow without carbon material, an aggregation phenomenon occurs between metals, and catalyst particles having a large average particle diameter may be prepared.

However, in the present invention, the catalyst particles may be evenly grown by heterogeneous nucleation on the surface of the carbon material, so that catalyst particles having an average particle diameter of 0.1 to 500 nm may be formed into the surface of the carbon material. Therefore, it is possible to increase the activity of the catalyst due to the high specific surface area of the catalyst particles, thereby improving the discharging capacity, average voltage, and lifetime characteristics of the lithium-sulfur battery, as described above.

The carbon material impregnated with catalyst particles may be sporadically distributed on at least a portion of the inside and the surface of the sulfur-carbon composite.

The sulfur-carbon composite of the present invention is for imparting conductivity to a nonconductive sulfur material, and is a combination of a carbon (C)-based material and a sulfur (S) particle, and preferably is in a shape in which sulfur particles are impregnated into a porous carbon-based material.

The carbon-based material contained in the sulfur-carbon composite may be the same as the carbon material impregnated with catalyst particles described above.

In addition, the sulfur particles impregnated into the carbon-based material may include an elemental sulfur ($S_8$), a sulfur-based compound, or a mixture thereof. Specifically, the sulfur-based compound may be $Li_2S_n$ (n≥1), an organic sulfur compound, a carbon-sulfur polymer (($C_2S_x)_n$: x=2.5~50, n≥2)), or the like.

The sulfur-carbon composite according to the present invention is not limited in relation to the type thereof, but may be a composite of sulfur and carbon nanotubes (S/CNT) according to one embodiment of the present invention.

In this case, the sulfur particles and carbon-based materials can be mixed in a weight ratio of 5:5 to 8:2 to produce sulfur-carbon composites. The method of impregnating the carbon-based material with the sulfur particles may be a variety of known methods, and the present invention is not limited thereto.

In addition, the sulfur-carbon composite is contained in an amount of 81.5 to 97.8% by weight, preferably 89.8 to 96.7% by weight based on the total weight of the positive electrode active material of the present invention.

If the sulfur-carbon composite is contained in an amount of less than 81.5% by weight, the performance of the lithium-sulfur battery may be reduced, and if the sulfur-carbon composite exceeds 97.8% by weight, the effect due to the catalyst may not be obtained.

Preparation Method of Positive Electrode Active Material

In addition, the present invention relates to a method for preparing a positive electrode active material for a lithium secondary battery of the present invention, which comprises the steps of:
(1) preparing a metal precursor solution;
(2) mixing the metal precursor solution with a carbon material to prepare a carbon material impregnated with catalyst particles;
(3) mixing a porous carbon material and sulfur to prepare a sulfur-carbon composite; and
(4) mixing the carbon material impregnated with catalyst particles and sulfur-carbon composite.

Step (1) is a step of preparing a metal precursor solution. The metal precursor may be at least one selected from the group consisting of nitrate, hydrochloride, sulfate, and acetate of metal selected from the group consisting of cerium (Ce), iron (Fe), cobalt (Co), nickel (Ni), molybdenum (Mo), titanium (Ti), copper (Cu), cadmium (Cd), lead (Pb), manganese (Mn), antimony (Sb), zinc (Zn), vanadium (V), and arsenic (As).

The solvent of the metal precursor solution is not particularly limited in relation to its kind as long as it can dissolve the metal precursor, but in the present invention, ethanol may be preferably used.

Step (2) is a step of mixing the metal precursor solution prepared in step (1) with a carbon material to prepare a carbon material impregnated with catalyst particles.

The metal precursor solution is dropped into the carbon material little by little and thus is mortar-mixed. After mixing, the mixture was dried at a temperature of about 50° C. to remove a solvent to obtain a carbon material powder impregnated with a metal precursor. The dried powder is heat treated in an inert atmosphere, preferably argon (Ar)

atmosphere, at a temperature of about 500° C. for 1 hour to finally prepare a carbon material impregnated with catalyst particles.

The kind of the carbon material is as described above, the catalyst particles impregnated into the carbon material may be a metal oxide or a metal sulfide, and the kind of the metal is as described above.

If the catalyst particle impregnated into the carbon material is a metal sulfide, after step (1), a step of mixing a sulfur precursor solution and a metal precursor solution may be added. After mixing the solution, step (2) of preparing a carbon material impregnated with catalyst particles by mixing the mixed solution with a carbon material can be performed.

The sulfur precursor solution may be a solution in which one or more selected from the group consisting of thioacetamide (TAA) and thiourea are dissolved, wherein the solvent may be water or ethanol.

Alternatively, after obtaining a carbon precursor powder into which a metal precursor is impregnated, sulfur powder may be mixed and subjected to heat treatment under the same conditions as above to finally prepare a carbon material impregnated with catalyst particles, wherein the catalyst particles may be iron sulfide.

The average particle diameter of the catalyst particles prepared in step (2) is 0.1 to 500 nm, preferably 0.1 to 100 nm, more preferably 0.1 to 50 nm. In addition, the catalyst particles are included in an amount of 10 to 50% by weight, preferably 20 to 40% by weight, based on the total weight of the carbon material impregnated with catalyst particles.

Step (3) is a step of mixing a porous carbon material and sulfur to prepare a sulfur-carbon composite. The mixing is to increase the degree of mixing between the above-mentioned materials, which can be carried out using a stirring device commonly used in the art. In this case, the mixing period and speed may also be selectively adjusted depending on the content and conditions of the raw materials. The heating temperature may be any temperature at which sulfur is melted, and specifically may be 120 to 180° C., preferably 150 to 180° C. If the heating temperature is less than 120° C., sulfur may not be sufficiently melted and thus the structure of the sulfur-carbon composite may not be properly formed. If the heating temperature exceeds 180° C., it is difficult to obtain the desired effect. In addition, the heating period can be adjusted depending on the content of sulfur.

Step (4) is a step of preparing a positive electrode active material by mixing the carbon material impregnated with catalyst particles prepared in step (2) and the sulfur-carbon composite prepared in step (3).

The carbon material impregnated with catalyst particles and sulfur-carbon composite are not particularly limited in relation to its kind as long as it is known in the art, and in the case of the present invention, are preferably mixed by ball milling to prepare a positive electrode active material.

Based on the total weight of the positive electrode active material, the carbon material impregnated with catalyst particles is contained in an amount of 2.2 to 18.5% by weight, preferably 3.3 to 10.2% by weight, and the sulfur-carbon composite is contained in an amount of 81.5 to 97.8% by weight, preferably 89.8 to 96.7% by weight.

In addition, the method of preparing the positive electrode active material for the lithium secondary battery of the present invention may be preferably a method of preparing a positive electrode active material for a lithium-sulfur battery.

Positive Electrode for Lithium Secondary Battery

In addition, the present invention relates to a positive electrode for a lithium secondary battery comprising a positive electrode active material for a lithium secondary battery of the present invention described above, wherein the positive electrode for the lithium secondary battery is preferably a positive electrode for a lithium-sulfur battery.

The positive electrode may be formed by applying a positive electrode composition to a current collector and vacuum-drying it.

The positive electrode current collector generally has a thickness of 3 to 500 μm and is not particularly limited as long as it has high conductivity without causing chemical change in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

The positive electrode composition may comprise the positive electrode active material of the present invention described above, and may further comprise a conductive material and a binder.

The conductive material plays a role in imparting the additional electrical conductivity to the positive electrode active material and allowing electrons to move smoothly in the positive electrode. The conductive material is not particularly limited as long as it is excellent in conductivity and can provide a large surface area without causing chemical change in the battery, but preferably a carbon-based material is used.

The carbon-based material may be at least one selected from the group consisting of graphite-based materials such as natural graphite, artificial graphite, expanded graphite, and graphene, activated carbon-based material, carbon black-based materials such as channel black, furnace black, thermal black, contact black, lamp black, and acetylene black; carbon fiber-based materials, carbon nanotubes (CNT), carbon nanostructures such as fullerene, and mixtures thereof.

In addition to the carbon-based materials, metallic fibers such as metal mesh; metallic powder such as copper (Cu), silver (Ag), nickel (Ni), and aluminum (Al); or organic conductive materials such as polyphenylene derivatives can also be used depending on the purpose. The conductive materials may be used alone or in combination.

In addition, the binder provides adhesive force to the current collector on the positive electrode active material. The binder should be well dissolved in the solvent, and should not only constitute the conductive network between the positive electrode active material and the conductive material, but also have a proper impregnation property for the electrolyte solution.

The binder applicable to the present invention may be any binder known in the art, and specifically may be, but is not limited to, at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders, polyester-based binders, and silane-based binders, or mixtures or copolymers of two or more thereof.

The content of the binder resin may be, but is not limited to, 0.5 to 30% by weight based on the total weight of the positive electrode composition for the lithium-sulfur battery. If the content of the binder resin is less than 0.5% by weight, the physical properties of the positive electrode may be deteriorated and thus positive electrode active material and the conductive material can be broken away. If the content exceeds 30% by weight, the ratio of the active material and the conductive material in the positive electrode is relatively reduced and thus the battery capacity can be reduced.

The positive electrode composition is prepared in a slurry state and is coated on the positive electrode current collector. The solvent for preparing in a slurry state should be easy to dry and should dissolve the binder well. Most preferably, the solvent capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the current collector during the coating process and thus there is a tendency that problems occur in the conductive network, thereby occurring problems in the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The positive electrode composition may be mixed by stirring by a conventional method using conventional mixers such as a paste mixer, a high-speed shear mixer, a homomixer, or the like.

The slurry can be coated on the current collector in an appropriate thickness depending on the viscosity of the slurry and the thickness of the positive electrode to be formed, and can be appropriately selected within a range of preferably 10 to 300 µm.

In this case, there is no limitation on the method of coating the slurry, and the method of coating the slurry may comprise, for example, a doctor blade coating, a dip coating, a gravure coating, a slit die coating, a spin coating, a comma coating, a bar coating, a reverse roll coating, a screen coating, a cap coating method and the like.

Lithium Secondary Battery

The present invention also relates to a lithium secondary battery comprising a positive electrode, a negative electrode, a separator interposed between the positive electrode and the negative electrode, and an electrolyte solution, wherein the positive electrode is a positive electrode for a lithium secondary battery of the present invention described above.

In addition, the lithium secondary battery of the present invention may be preferably a lithium-sulfur battery.

The negative electrode may be composed of a current collector and a negative electrode active material layer formed on one or both surfaces thereof. In addition, the negative electrode may be a lithium metal plate.

The current collector is for supporting a negative electrode active material and is not particularly limited as long as it is electrochemically stable in the voltage range of the lithium secondary battery while having excellent conductivity. For example, copper, stainless steel, aluminum, nickel, titanium, palladium, sintered carbon; copper or stainless steel surface-treated with carbon, nickel, silver or the like; aluminum-cadmium alloy or the like may be used as the current collector.

The negative electrode current collector can enhance the bonding force with the negative electrode active material by having fine irregularities formed on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reversibly forming lithium containing compounds by reacting with lithium ion, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator separates or insulates the positive electrode and the negative electrode from each other, and enables transport of lithium ions between the positive electrode and the negative electrode, and may be made of a porous nonconductive or insulating material. Such a separator may be an independent member such as a film and may be a coating layer added to the positive electrode and/or the negative electrode.

Materials forming the separator comprise, but are not limited to, for example, polyolefins such as polyethylene and polypropylene, glass fiber filter papers, and ceramic materials, the thickness of which may be about 5 to about 50 µm, preferably about 5 to about 25 µm.

The electrolyte solution is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt is not particularly limited as long as it can be conventionally used in electrolyte solution for a lithium-sulfur battery. For example, LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate, etc. can be used.

In addition, the concentration of the lithium salt in the electrolyte solution may be 0.2 to 2 M, specifically 0.6 to 2 M, more specifically, 0.7 to 1.7 M. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3- dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li2_S$-$SiS_2$ may be used.

To the electrolyte of the present invention, for example, pyridine, triethylphosphite, triethanolamine, cyclic ether, ethylene diamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrodes.

Hereinafter, the present invention will be described in detail with reference to examples. However, the examples according to the present invention can be modified in many different forms, and the scope of the invention should not be construed as limited to the examples described below. The examples of the present invention are provided to more completely explain the present invention to those skilled in the art.

<Preparation of Carbon Material Impregnated with Catalyst Particle>

Preparation Example 1. Preparation of Carbon Material (Ce-Oxide@CNT) Impregnated with Cerium Oxide Cerium nitrate was dissolved in ethanol to prepare 3 mM of a cerium nitrate solution. 5 mL of the cerium nitrate solution per 1 g of carbon nanotubes (CNT) was dropped and mortar-mixed. Thereafter, the mixture was dried at a temperature of 50° C. to obtain a powder, and the powder was heat-treated at a temperature of 500° C. for 1 hour in an inert atmosphere to prepare a carbon material impregnated with cerium oxide (Ce-oxide@CNT). The average particle diameter of the cerium oxide was 70 nm.

Preparation Example 2. Preparation of Carbon Material Impregnated with Cobalt Oxide (Co-Oxide@CNT)

A carbon material impregnated with cobalt oxide (Co-oxide@CNT) was prepared in the same manner as in Preparation Example 1 above, except that cobalt nitrate is used in place of cerium nitrate, and the concentration of the solution is 7 mM. The average particle diameter of the cobalt oxide was 500 nm.

Preparation Example 3. Preparation of Carbon Material Impregnated with Iron Oxide (Fe-Oxide@CNT)

A carbon material impregnated with iron oxide (Fe-oxide@CNT) was prepared in the same manner as in Preparation Example 1 above, except that ferric nitrate is used in place of cerium nitrate, and the concentration of the solution is 7.5 mM. The average particle diameter of iron oxide was 60 nm.

Preparation Example 4. Preparation of Carbon Material Impregnated with Cobalt Sulfide (Co-Sulfide@CNT)

Cobalt nitrate was dissolved in ethanol to prepare 14 mM of a cobalt nitrate solution. 28 mM of thioacetamide solution was prepared by dissolving $C_2H_5NS$ (thioacetamide: TAA) in ethanol. The cobalt nitrate solution and thioacetamide solution were stirred and mixed.

5 mL of the mixed solution per 1 g of carbon nanotubes (CNT) was dropped and mortar-mixed. Thereafter, the mixture was dried at a temperature of 50° C. to obtain a powder, and the powder was heat-treated at a temperature of 500° C. for 1 hour in an inert atmosphere to prepare a carbon material impregnated with cobalt sulfide (Co-sulfide@CNT). The average particle diameter of cobalt sulfide was 50 nm.

Preparation Example 5. Preparation of Carbon Material Impregnated with Nickel Sulfide (Ni-Sulfide@CNT)

A carbon material impregnated with nickel sulfide (Ni-sulfide@CNT) was prepared in the same manner as in Preparation Example 4 above, except that nickel nitrate is used in place of cobalt nitrate, and the concentration of the solution is 7 mM. The average particle diameter of nickel sulfide was 100 nm.

Preparation Example 6. Preparation of Carbon Material Impregnated with Iron Sulfide (Fe-Sulfide@CNT)

Ferric nitrate was dissolved in ethanol to prepare 14 mM of an iron nitrate solution. 5 mL of the iron nitrate solution per 1 g of carbon nanotubes (CNT) was dropped and mortar-mixed. Thereafter, the mixture was dried at a temperature of 50° C. to obtain a powder. The powder and sulfur were evenly mixed and then heat-treated at an inert atmosphere at a temperature of 500° C. for 1 hour to prepare a carbon material impregnated with carbon sulfide (Fe-sulfide @ CNT). The average particle diameter of iron sulfide was 30 nm.

Experimental Example 1. Analysis of Carbon Material Impregnated with Catalyst Particle 1-1. Analysis of Crystal Structure of Carbon Material Impregnated with Catalyst Particle The structures of the carbon materials impregnated with catalyst particles prepared in Preparation Examples 1 to 6 were analyzed through measurement data of a powder X-ray diffraction (XRD) pattern.

The results of XRD measurement of the carbon materials impregnated with catalyst particles prepared in Preparation Examples 1 to 3 are shown in FIG. 3. From the results, it was confirmed that cerium nitrate, cobalt nitrate, and iron nitrate which are catalyst particle precursors of Preparation Examples 1 to 3 are completely decomposed to form crystals of cerium oxide, cobalt oxide, and iron oxide, respectively.

The results of XRD measurement of the carbon materials impregnated with catalyst particles prepared in Preparation Examples 4 to 6 are shown in FIG. 4. From the results, it was confirmed that cobalt nitrate and nickel nitrate which are catalyst particle precursors of Preparation Examples 4 and 5 and thioacetamide which is a sulfur ion precursor are decomposed and reacted to form crystals of cobalt sulfide and nickel sulfide, respectively. In addition, it was confirmed that iron nitrate which is a catalyst particle precursor of Preparation Example 6 is reacted with sulfur to form crystals of iron sulfide.

That is, it was confirmed that the catalyst particles of the carbon material impregnated with catalyst particles prepared in Preparation Examples 1 to 6 are impregnated into the carbon material in the form of crystals of metal oxide or metal sulfide.

1-2. Content Measurement of Catalyst Particles in Carbon Material Impregnated with Catalyst Particles The content of catalyst particles of a carbon material impregnated with catalyst particles prepared in Preparation Examples 1 to 6 was measured by thermogravimetric analysis (TGA).

The results of TGA measurement of the carbon materials impregnated with catalyst particles prepared in Preparation Examples 1 to 3 are shown in FIG. 5. In the above measurement, the content ratio of the catalyst particles and the carbon nanotubes was estimated by the weight of the residual material produced while the carbon nanotubes were oxidized. From the above results, it was confirmed that the catalyst particles of Preparation Examples 1 to 3 were contained in an amount of about 30 to 40% by weight based on the total weight of the carbon material impregnated with catalyst particles.

In addition, the results of TGA measurement of the carbon materials impregnated with catalyst particles prepared in Preparation Examples 4 to 6 are shown in FIG. 6. In the above measurement, the carbon nanotubes and the catalyst particles were simultaneously oxidized, and the content ratio of the catalyst particles and the carbon nanotubes was estimated by assuming that the weight of the residual material was metal sulfide. From the above results, it was confirmed that the catalyst particles of Preparation Examples 4 to 6 were contained in an amount of about 20 to 30% by weight based on the total weight of the carbon material impregnated with catalyst particles.

1-3. Analysis of Elemental Distribution of the Carbon Material Impregnated with Catalyst Particles The components composed of the carbon materials impregnated with catalyst particles prepared in Preparation Example 3 and Preparation Example 4 were observed with a scanning electron microscope (SEM) equipped with an energy dispersive x-ray analyzer (EDX).

As compared with SEM image (FIG. 9) of observing a carbon nanotube, it was confirmed that the carbon materials impregnated with catalyst particles prepared in Preparation Example 3 and Preparation Example 4 have carbon nanotubes impregnated with catalyst particles (FIGS. 7 and 8).

In addition, from the results of EDX of Preparation Example 3, it was confirmed that iron oxide was impregnated into the carbon nanotubes (FIG. 10), and from the EDX results of Preparation Example 4, it was confirmed that cobalt sulfide was impregnated into the carbon nanotubes (FIG. 11).

<Preparation of Positive Electrode for Lithium-Sulfur Battery>

Example 1

0.5 g of carbon nanotubes and 1.5 g of sulfur were evenly mixed and then heat-treated at 155 for 30 minutes to prepare a sulfur-carbon composite.

The sulfur-carbon composite, the conductive material, the binder, and the carbon material impregnated with the catalyst metal (Fe-oxide@CNT) of Preparation Example 3 were mixed at a weight ratio of 83.8:4.8:6.7:4.7 to prepare a positive electrode composition in a slurry form, and then coated the obtained composition on a current collector of aluminum foil having the thickness of 20 μm, followed by sequentially drying at a temperature of 50° C. for 2 hours and at a temperature of 80° C. for 2 hours to prepare a positive electrode for a lithium-sulfur battery.

At this time, a vapor grown carbon fiber (VGCF) was used as the conductive material, and polyacrylic acid was used as the binder.

Example 2

A positive electrode for a lithium-sulfur battery was prepared in the same manner as in Example 1, except that the Co-sulfide@CNT prepared in Preparation Example 4 is used as the carbon material impregnated with the catalyst metal.

Comparative Example 1

0.5 g of carbon nanotubes and 1.5 g of sulfur were evenly mixed and then heat-treated at 155° C. for 30 minutes to prepare a sulfur-carbon composite.

A positive electrode composition was prepared in the form of a slurry by mixing the sulfur-carbon composite, the conductive material, and the binder in a weight ratio of 88:5:7 of the sulfur-carbon composite:the conductive material:the binder, and coated on a current collector of an aluminum foil having a thickness of 20 μm, and then sequentially dried at a temperature of 50° C. for 2 hours, and at a temperature of 80° C. for 2 hours to prepare a positive electrode for lithium-sulfur battery.

At this time, a vapor grown carbon fiber (VGCF) was used as the conductive material, and polyacrylic acid was used as the binder.

Comparative Example 2

0.5 g of carbon nanotubes and 1.5 g of sulfur were evenly mixed and then heat-treated at 155° C. for 30 minutes to prepare a sulfur-carbon composite.

A positive electrode composition was prepared in the form of a slurry by mixing the sulfur-carbon composite, the conductive material, the binder, and the carbon nanotube in a weight ratio of 88:5:7:5 of the sulfur-carbon composite:the conductive material:the binder:the carbon nanotube and dissolving in DI water, and coated on a current collector of an aluminum foil having a thickness of 20 μm, and then sequentially dried at a temperature of 50° C. for 2 hours, and at a temperature of 80° C. for 2 hours to prepare a positive electrode for lithium-sulfur battery.

At this time, a vapor grown carbon fiber (VGCF) was used as the electrically conductive material, and polyacrylic acid was used as the binder.

Experimental Example 2. Evaluation of Charging/Discharging and Lifetime Characteristics of Lithium-Sulfur Battery Each lithium-sulfur battery was manufactured using the positive electrodes prepared in Examples 1 and 2 and Comparative Examples 1 and 2.

Lithium foil having a thickness of about 45 μm was used as a negative electrode, a mixed electrolyte solution of 2-methyltetrahydrofuran and ethylene glycol ethylmethyl ether (1:2 by volume) in which 0.75M LiFSI (lithium bis(fluorosulfonyl)imide) and 3% by weight of $LiNO_3$ were dissolved was used as an electrolyte solution, and 20 micron of polyethylene was used as a separator.

2-1. Evaluation of Charging/Discharging

For the lithium-sulfur batteries of Examples 1 to 2 and Comparative Examples 1 to 2, the change of the charging/discharging characteristics was tested using the charging/discharging measuring device. The obtained battery was examined for initial capacity at 0.1C/0.1C charging/discharging conditions, and the results are shown in FIG. 12.

Comparative Example 1 contains only the sulfur-carbon composite as a positive electrode active material, Comparative Example 2 contains the carbon nanotube and the sulfur-carbon composite, and Examples 1 and 2 contain the carbon material impregnated with catalyst particles and the sulfur-carbon composite.

It was found that the discharging capacity and overvoltage of the batteries of Comparative Example 2, Example 1, and Example 2 were improved, as compared with Comparative Example 1 which does not comprise the catalyst particle and the carbon material.

2-2. Evaluation of Lifetime Characteristics

The charging/discharging measuring device was used to measure the lifetime characteristics by repeatedly charging/discharging at 0.1C/0.1C for the first 3 cycles, charging/discharging at 0.2C/0.2C for 3 cycles, and then charging/discharging at 0.5C/0.5C for 150 cycles, and the results are shown in FIG. 13.

Comparative Example 1 which does not comprise the carbon material impregnated with the catalyst particles as a positive electrode active material did not have good lifetime characteristics, and Comparative Example 2, which comprises the carbon material and the sulfur-carbon composite as a positive electrode active material, showed high retention capacity but rapid degradation rate of the battery.

It was confirmed that Example 1 comprising the carbon material impregnated with iron oxide and the sulfur-carbon composite as a positive electrode active material has a relatively low discharging retention capacity but a slow degeneration, and Example 2 comprising a carbon material impregnated with cobalt sulfide and sulfur-carbon composite as a positive electrode active material has a high discharging retention capacity and delays the time of battery degeneration.

Therefore, it was confirmed that the lithium-sulfur battery comprising the positive electrode active material for the lithium-sulfur battery which comprises the carbon material impregnated with catalyst particles; and the sulfur-carbon composite has excellent discharging capacity and improved lifetime characteristics.

The invention claimed is:

1. A positive electrode active material for a lithium secondary battery comprising a mixture of:
   carbon nanotubes impregnated with catalyst particles, wherein the catalyst particles are on a surface of the carbon nanotubes; and
   a sulfur-carbon composite consisting of a composite of sulfur particles and carbon nanotubes (S/CNT);
   wherein the sulfur particles and carbon nanotubes are in a weight ratio of 5:5 to 8:2 in the sulfur-carbon composite;
   wherein the carbon nanotubes impregnated with catalyst particles are distributed on at least a portion of the inside and a surface of the sulfur-carbon composite, and
   wherein the catalyst particles comprise a metal oxide or a metal sulfide, and
   wherein the metal oxide or metal sulfide is at least one selected from the group consisting of cerium oxide, cobalt sulfide, nickel sulfide and iron sulfide.

2. The positive electrode active material for the lithium secondary battery of claim 1, wherein the catalyst particles comprise at least one selected from the group consisting of cobalt sulfide, nickel sulfide and iron sulfide.

3. The positive electrode active material for the lithium secondary battery of claim 1, wherein an average particle diameter of the catalyst particles is 0.1 nm to 500 nm.

4. The positive electrode active material for the lithium secondary battery of claim 1, wherein the catalyst particles are present in an amount of 10% by weight to 50% by weight based on a total weight of the carbon nanotubes impregnated with catalyst particles.

5. The positive electrode active material for the lithium secondary battery of claim 1, wherein the carbon nanotubes impregnated with catalyst particles is present in an amount of 2.2% by weight to 18.5% by weight based on a total weight of the positive electrode active material for the lithium secondary battery.

6. The positive electrode active material for the lithium secondary battery claim 1, wherein the positive electrode active material for the lithium secondary battery is a positive electrode active material for a lithium-sulfur battery.

7. A positive electrode for a lithium secondary battery comprising the positive electrode active material of claim 1.

8. A lithium secondary battery comprising a positive electrode; a negative electrode; a separator interposed between the positive electrode and the negative electrode; and an electrolyte solution, wherein the positive electrode is the positive electrode of claim 7.

9. The lithium secondary battery of claim 8, wherein the lithium secondary battery is a lithium-sulfur battery.

10. A method for preparing a positive electrode active material for a lithium secondary battery according to claim 1, comprising the steps of:
   (1) preparing a metal precursor solution;
   (2) mixing the metal precursor solution with a carbon nanotubes to prepare carbon nanotubes impregnated with catalyst particles;
   (3) mixing a porous carbon material and sulfur to prepare a sulfur-carbon composite; and
   (4) mixing the carbon material impregnated with catalyst particles and sulfur-carbon composite, resulting in the positive electrode active material for the lithium secondary battery according to claim 1,
   wherein the carbon nanotubes are distributed on at least a portion of the inside and a surface of the sulfur-carbon composite, and
   wherein the catalyst particles comprise a metal oxide or a metal sulfide, wherein the metal oxide or metal sulfide is at least one selected from the group consisting of cerium oxide, cobalt sulfide, nickel sulfide and iron sulfide.

11. The method for preparing the positive electrode active material for the lithium secondary battery of claim 10, wherein the catalyst particles comprise at least one selected from the group consisting of cobalt sulfide, nickel sulfide and iron sulfide.

12. The method for preparing the positive electrode active material for the lithium secondary battery of claim 10, wherein the catalyst particles are cerium oxide.

13. The method for preparing the positive electrode active material for the lithium secondary battery of claim 10, wherein the method further comprises, after step (1), a step of mixing solution of at least one selected from the group consisting of thioacetamide and thiourea, and the metal precursor solution of step (1).

* * * * *